United States Patent [19]
Johnson

[11] Patent Number: 4,969,834
[45] Date of Patent: Nov. 13, 1990

[54] JUMPER CABLE APPARATUS

[76] Inventor: Robert A. Johnson, 702 Sunnyside Ave., San Diego, Calif. 92114

[21] Appl. No.: 415,570

[22] Filed: Oct. 2, 1989

[51] Int. Cl.$^5$ .......................... H02J 7/00; H01R 11/00
[52] U.S. Cl. ...................................... 439/141; 320/25; 439/490; 439/504
[58] Field of Search ............... 439/503, 504, 489, 490, 439/140, 141; 320/2, 25, 26, 48

[56] References Cited

U.S. PATENT DOCUMENTS

| | | | |
|---|---|---|---|
| 3,754,205 | 8/1973 | Lenkey | 439/141 |
| 4,145,648 | 3/1979 | Zender | 439/504 |
| 4,238,722 | 12/1980 | Ford | 320/25 |
| 4,272,142 | 6/1981 | Zapf | 439/504 |
| 4,349,774 | 9/1982 | Farque | 439/504 |
| 4,386,818 | 6/1983 | Millhines et al. | 439/504 |

FOREIGN PATENT DOCUMENTS 660645  5/1938  Fed. Rep. of Germany ...... 439/141

*Primary Examiner*—Neil Abrams
*Attorney, Agent, or Firm*—Andsel Group

[57] ABSTRACT

A jumper cable apparatus to interconnect two batteries is described. The apparatus has a first and second connecting means that releasably engage each other. The first and second connecting means have a polarity-sensitive and current-limiting circuit within each connecting means with one or more colored LEDs, a current-limiting resistor and a piezoelectric alarm. The circuits also indicate when one of the batteries may have an open or short cell. The second connecting means has an electrically insulative, translating block means to reduce the chance of accidental contact with the interior of the connecting means and to reduce the chance of arcing outside of the electrically insulated housing and block means. The apparatus may have an extension cable apparatus to assist jumping the batteries when access to the batteries may be difficult. The housings of the connecting means have bosses and slots to aid in the alignment of the housings and to align the positive cables when the housings are interconnected.

7 Claims, 2 Drawing Sheets

JUMPER CABLE APPARATUS

BACKGROUND OF THE INVENTION

1. Field of the Invention

This invention relates to a jumper cable to interconnect two batteries and to indicate if the polarity is correct. The invention also provides an indication if one of the batteries has an internal short circuit or an open circuit cell within the battery. The invention also relates to a jumper cable that eliminates the chance of accidental arcing near either of the batteries involved in the jumping or boosting process.

2. Description of the Related Art

In the past several configurations of jumper cables have been developed to enable the user to start a vehicle with a low battery by utilizing another battery more fully charged. The problems sought to be overcome have been convenience and safety. Previous attempts to solve these problems have resulted in various devices.

Richard L. Zapf U.S. Pat. No. 4,272,142 on June 9, 1981 describes a jumper cable with a red and green light and a set of diodes to limit current flow to indicate if the clamps were not secured to the proper battery terminals.

C. Anthony Farque U.S. Pat. No. 4,349,774 on Sept. 14, 1982 describes a apparatus for use with a jumper cable which is said to allow attachment to the battery terminals without regard to polarity of the terminals. The device is described as utilizing a circuit that activates the two terminal blocks and establishes proper polarity only when the contacts within the blocks when are properly aligned by turning the blocks relative to each other. The device uses a diode bridge and logical AND gates along with a solenoid as part of the circuit of the apparatus.

Wayne L. Millhimes U.S. Pat. No. 4,386,818 on June 7, 1983 describes a polarity indicating connector for battery jumper cables. The connector provides a two state LED device with a green light to indicate proper polarity and a red light to indicate improper polarity.

SUMMARY OF THE INVENTION

The present invention is an jumper cable apparatus to reduce the effects of improper jumper cable termination and to eliminate the chance of accidental arcing near the batteries involved in the jumping or boosting process.

A jumper cable apparatus is provided that has a first charging transfer cable having on a first end a first attaching means and a second charging transfer cable having on a second end a second attaching means to releasably attach the first and second charging transfer cables to a first pair of battery terminals. A third charging transfer cable has on a third end a third attaching means and a fourth charging transfer cable has on a fourth end a fourth attaching means to releasably attach the third and fourth charging transfer cables to a second pair of battery terminals. There is a first connecting body means, including circuit means, to sense polarity and to limit current attached to a fifth end of the first charging transfer cable and attached to a sixth end of the second charging transfer cable. There is a second connecting body means, including circuit, means to sense polarity attached to a seventh end of the third charging transfer cable and attached to an eighth end of the fourth charging transfer cable. The second connecting means is selectively engaged with the first connecting means to allow transfer of current between a first battery and a second battery. There is, in the second connecting means, an insulative translating block means to reduce contact with an interior of the second connecting means.

The first connecting means has a positive probe receiver connected to the fifth end of the first charging transfer cable and a negative probe receiver connected to the sixth end of the second cable of the first pair of charging transfer cables. The first connecting means has a first electrical circuit means to electrically interconnect the first and second charging transfer cables. In the first circuit means are a first polarity-sensitive LED and a first circuit test switch. There is a first current-limiting resistor in the first circuit means allowing current flow between the first switch and the first LED. There is provided a first polarity-sensitive piezoelectric alarm in the first circuit means allowing and sensing reverse current flow between the first switch and the negative probe receiver. The first circuit means has a thermally-activated circuit breaker that allows and limits current flow between the negative probe receiver and the second charging transfer cable. Also included in the first circuit means are an incandescent lamp and a nonpolarity-sensitive alarm allowing current flow between the negative probe receiver and the second charging transfer cable when the circuit breaker interrupts current flow between the negative probe receiver and the second charging transfer cable. The first switch in the first circuit means allows selective current flow from the positive probe receiver, through the first switch, through the first current-limiting resistor, through the first LED, through the first piezoelectric alarm and to the second charging transfer cable.

The second connecting means has a positive probe connected to the seventh end of a third charging transfer cable and a negative probe connected to the eighth end of a fourth charging transfer cable. There is a second electrical circuit means in the second connecting means to electrically interconnect the third and fourth charging transfer cables. The second circuit means contains a second polarity-sensitive LED and a second circuit test switch. There is also a second current-limiting resistor in the second circuit means allowing current flow between the second switch and the second LED. The second circuit has a second polarity-sensitive piezoelectric alarm to allow and sense reverse current flow between the second switch and the negative probe. The second switch in the second circuit means allows selective current flow from the positive probe, through the second switch, through the second current-limiting resistor, through the second piezoelectric alarm and to the negative probe. The positive and negative probe receivers are selectively engaged with the positive and negative probes to allow transfer of current between a first battery and a second battery.

The jumper cable apparatus may have an extension cable apparatus to extend the length of the jumper cable apparatus. The extension cable apparatus may have a fifth and sixth charging transfer cable and may have a means for mating with the first connecting means attached to a ninth end of the fifth charging transfer cable and to a tenth end of the sixth charging transfer cable. The extension cable apparatus may also have a means for mating with the second connecting means attached to an eleventh end of the fifth charging transfer cable and to a twelfth end of the sixth charging transfer cable.

The jumper cable apparatus may have the first, second, third and fourth attaching means color coded to further assist and facilitate which attaching means is to be attached to a positive terminal of the first and second pair of battery terminals.

It is therefore one object of this invention to provide a jumper cable apparatus that provides a visual and audible indication of proper or improper polarity connection.

It is another object to provide a jumper cable that reduces the chance of accidental arcing near the batteries involved in the jumping or boosting process.

It is yet another object of this invention to provide a jumper cable that provides an indication of an open circuited or a short circuited battery condition.

Another object of this invention is to provide a jumper cable with an extension that allows use of the jumper cable in situations where the positioning of the assisting vehicle in a front-to-front arrangement is difficult or too dangerous to obtain.

DESCRIPTION OF THE PREFERRED EMBODIMENT

Figure 8:
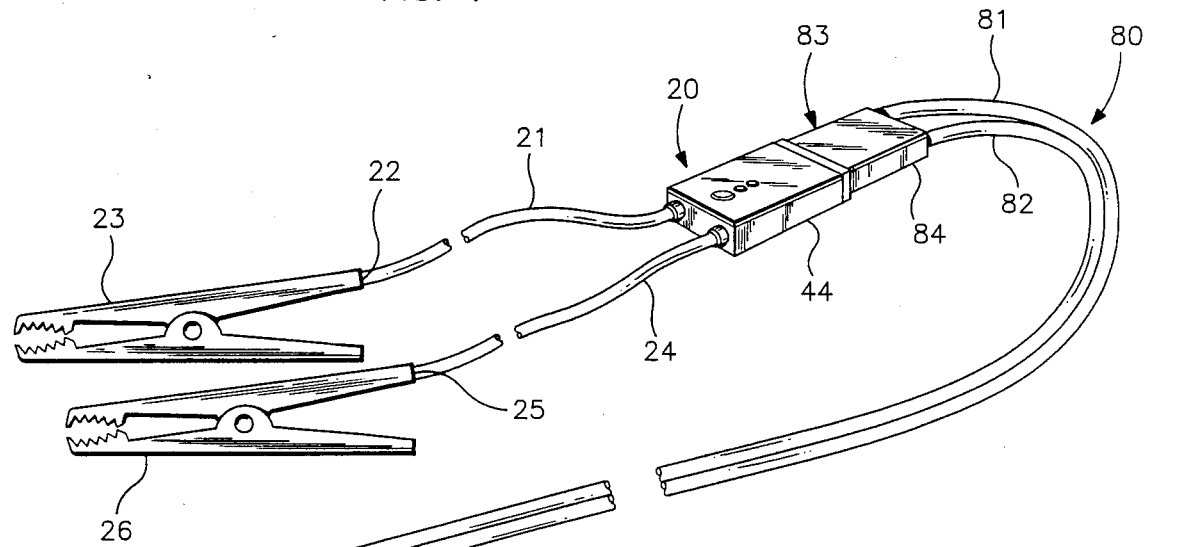
FIG. 8 is partial longitudinal view showing the jumper cable apparatus and the extension cable.
Figure 8:
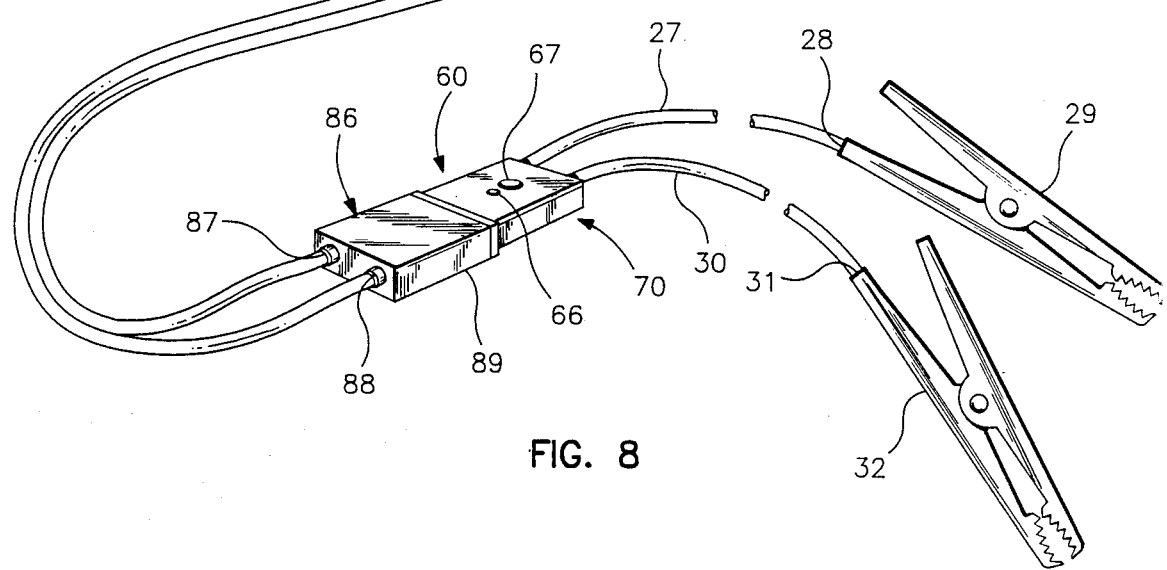

FIG. 8 illustrates the jumper cable apparatus 10 connected to the extension cable 80 at first connecting means 20 and at second connecting means 60. FIG. 8 shows the first charging transfer cable 21 having on a first end 22 a first attaching means 23 and the second charging transfer cable 24 having on a second end 25 a second attaching means 26. The third charging transfer cable 27 has on the third end 28 a third attaching means 29 and the fourth charging transfer cable 30 has on a fourth end 31 a fourth attaching means 32. These attaching means may be spring-loaded clamps to releasably attach the first, second, third and fourth charging transfer cables to the positive and negative terminals of the batteries (not shown) involved in the jump starting or boosting process.

Figures 4, 5:
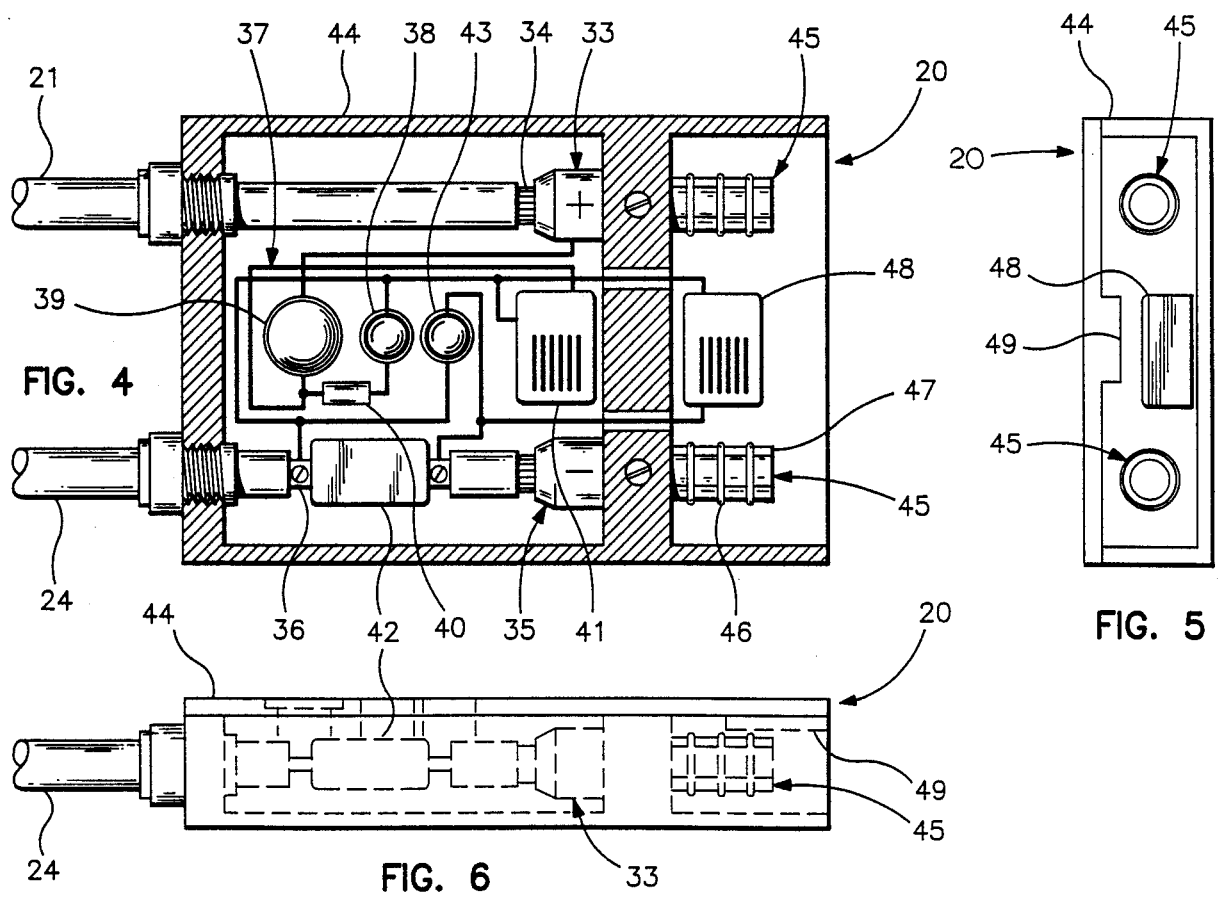
FIG. 4 is a partial sectional top view of the first connecting means.
FIG. 5. is a front view of the first connecting means.
Figure 6:
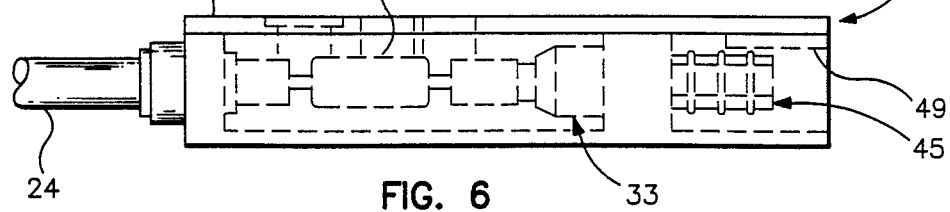
FIG. 6 is a side view of the first connecting means utilizing hidden lines to show the relationship of the elements within the housing and the alignment tab.
Figure 7:
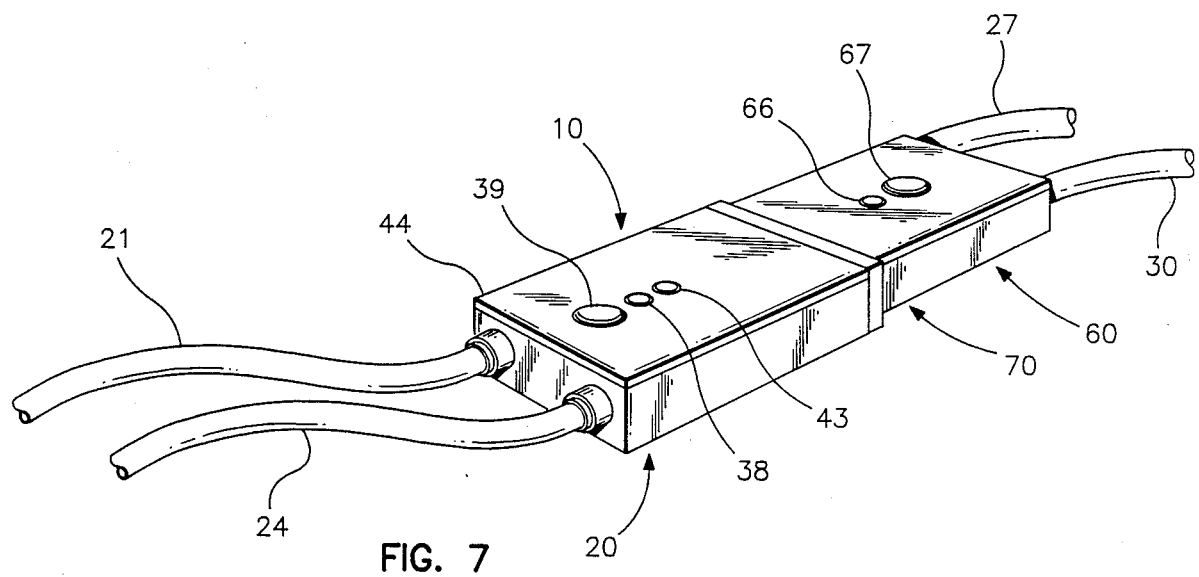
FIG. 7 is a partial top view showing the first and second connecting means engaged with each other.

In the first connecting means 20 (FIG.4), a positive probe receiver 33 is connected to the fifth end 34 of the first charging transfer cable 21 and the negative probe receiver 35 is connected to the sixth end 36 of the second charging transfer cable 24. A first electrical circuit means 37 is provided to electrically interconnect the first and second charging transfer cables. In the first circuit means 37, there is a first polarity-sensitive LED 38 that allows current flow in only one direction. LED 38 is normally green in color and indicates, when lit, that the positive cable 21 and the negative cable 24 are properly connected to the positive terminal and negative terminal, respectively, of the battery (not shown).

The first circuit and the second circuit are normally open circuits which are closed when the press-to-test switches are pressed to complete the circuits. The polarity of the current in the cables on the first and second connecting means are checked before the first and second connecting means are engaged with each other. There is a first circuit test switch 39 in the first circuit 37. The first switch 39 is a press-to-test switch (although switches that are operated differently may be used) that activates the first circuit means 37 to allow current flow through the first circuit to test whether the positive and negative cables are connected properly. When the switch 39 is pressed and the cables are connected to the proper terminal of the battery, the green LED 38 will light. Switch 39, when pressed, allows current flow between the positive probe receiver 33, the first current-limiting resistor 40, the first LED 38, and the second charging transfer cable 24 if the polarity is correct. There is a first current-limiting resistor 40 in the first circuit means 37 allowing current flow between the first switch 39 and the first LED 38. In circuit 37, is a first polarity-sensitive piezoelectric alarm 41 and a red incandescent light 43. In circuit 37, the first polarity-sensitive piezoelectric alarm 41 will indicate reversed current flow. When reverse-polarity current flows through the alarm 41, the alarm will sound. If the piezoelectric alarm 41 sounds, the polarity of the current in the first circuit 37 is incorrect because the cables 21 and 24 are attached to the wrong terminals of the battery. The cables 21 and 24 should be placed on opposite terminals of the battery and the first switch pressed to test first circuit 37 once more for proper polarity illuminating green LED 38 indicating proper hook-up.

A thermally-activated circuit breaker 42 in the first circuit means 37 allows and limits current flow between the negative probe receiver 35 and the second charging transfer cable 24. When the first and second connecting means are engaged with each other and either the battery clamps are connected to the wrong terminals on one of the batteries or the battery of the vehicle being assisted has developed an internal short circuit, the current entering the circuit breaker 42 exceeds a preset design limit and the circuit breaker 42 interrupts the flow of current between the cable 24 and the negative probe receiver 35. When the current flow through circuit breaker 42 is interrupted, current flows through an alternate path in the first circuit. In this alternate path of the first circuit means 37, are an (indication means) incandescent lamp 43, usually red in color, and a nonpolarity-sensitive alarm 48 (usually 12 volt although the jumper cable apparatus 10 will be designed for various voltage systems) that allow current flow when the circuit breaker 42 interrupts current flow between the negative probe receiver 35 and the second charging transfer cable 24. If the red incandescent lamp 43 lights and the nonpolarity-sensitive alarm sounds, this may indicate an internal short circuit has developed in the battery being assisted or in the assisted vehicle's circuitry that is terminated at the battery post. The battery may need replacement and it would be dangerous to continue attempting to charge such a battery. The batteries should be checked by a qualified technician before the jumping or boosting process is reinitiated.

The first connecting means includes housing 44 made of an electrically insulative material which encloses first circuit means 37. Positive probe receiver 33 and negative probe receiver 35 have tempered brass (or other suitable materials) receivers 45 which are slit at 90 degree intervals (see 47) and encircled by cinch rings 46. The receivers 45 are of sufficient length to accommodate the positive probe 61 and negative probe 62 and are of sufficient diameter to releasably secure the probes with the aid of the cinch rings 46. In housing 44 is a male alignment boss 49.

In the second connecting means 60, is a positive probe 61 connected to the seventh end 63 of the third charging transfer cable 27 and the negative probe 62 connected to an eighth end 64 of the fourth charging transfer cable 30. In the second connecting means 60, is a second circuit means 65 to electrically interconnect the third charging transfer cable 27 with the fourth charging transfer cable 30. The second circuit means 65 has a second polarity-sensitive LED 66 that allows current flow in only one direction. LED 66 is normally green in color and indicates, when lit, that the positive cable 27 and the negative cable 30 are connected to the positive terminal and to the negative terminal, respectively, of the battery (not shown).

There is a second circuit test switch 67 in the second circuit means 65. The second switch 67 is a press-to-test switch that activates the second circuit to allow current flow through the second circuit to test whether the positive cable 27 and the negative cable 30 are connected properly. When the second switch 67 is pressed, and the cables 27 and 30 are connected to the proper terminal of the battery, the green LED 66 will light. Switch 67, when pressed, allows the selective current flow between the positive probe 61, the second current-limiting resistor 68 which feeds current to the green LED 66 indicating proper polarity. The second piezoelectric alarm 69, connected to the negative probe 62, will activate if the polarity is incorrect. There is a second current-limiting resistor 68 in the second circuit means 65 allowing current flow between the second switch 67 and the second LED 66. In the second circuit means 65 is a second polarity-sensitive piezoelectric alarm 69 that allows and senses reversed current flow between the second switch 67 and the negative probe 62. If the second piezoelectric alarm 69 sounds, the polarity in the second circuit is incorrect indicating that cables 27 and 30 are attached to the wrong terminals of the battery. The cables 27 and 30 should be then placed on opposite terminals of the battery and the second switch pressed to test the second circuit once more for proper polarity. In the event that the second green LED 66 does not light, LED 66 has possibly been damaged. If by exchanging the transfer cables from one battery to another, the green LED 38 lights, this would verify that the green LED 66 is damaged. Engage the first and second connecting means with each other. If the circuit breaker 42 of first circuit 37 does not interrupt the flow of current and the alarm 48 does not sound or the red lamp 43 does not illuminate, carefully continue with the jumping or boosting process. The user is advised, for safety, not to continue to attempt to jump or boost the battery if the circuit breaker 42 trips and the alarm 48 and red lamp 43 are activated until the battery is examined by a qualified technician to determine the condition of the battery. Such an indication usually implies that the battery should be replaced.

The second connecting means includes a housing 70 made of an electrically insulative material which encloses second circuit means 65. Positive probe 61 and negative probe 62 have tempered brass (or other suitable materials) probe conductors 71 that may be shaped on the end 72 to facilitate entry into receivers 45. Housing 70 has a female slot 75 into which male boss 49 is inserted to assist in the mutual alignment of the first connecting means and the second connecting means when they are being engaged with each other.

Figures 1, 2:
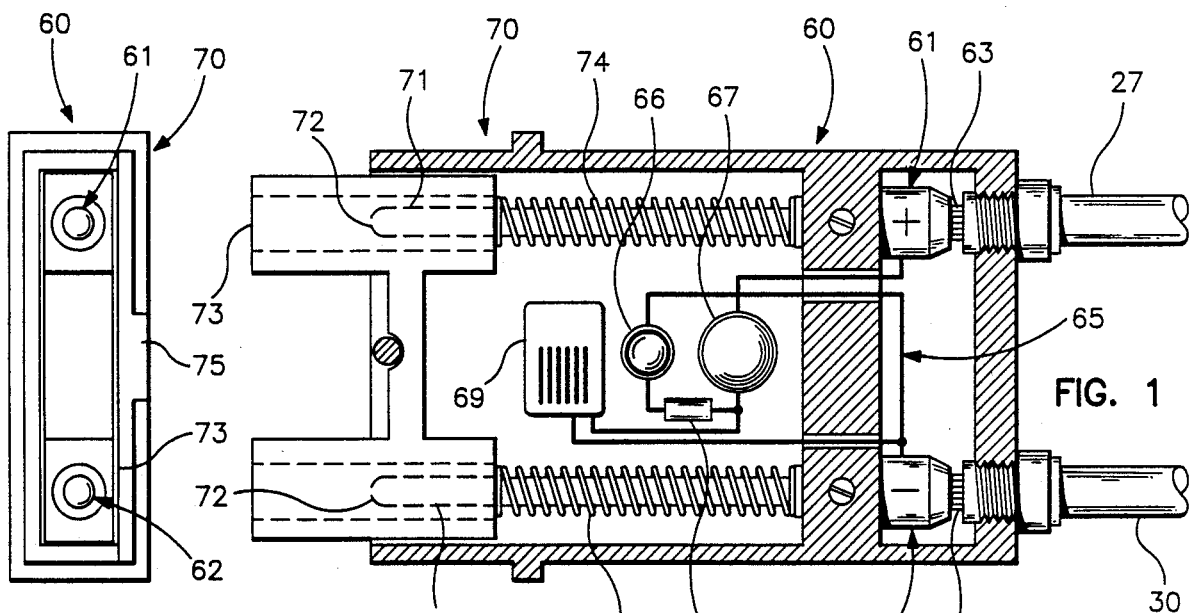
FIG. 1 is a partial sectional top view of the second connecting means.
FIG. 2 is a front view of the second connecting means.
Figure 3:
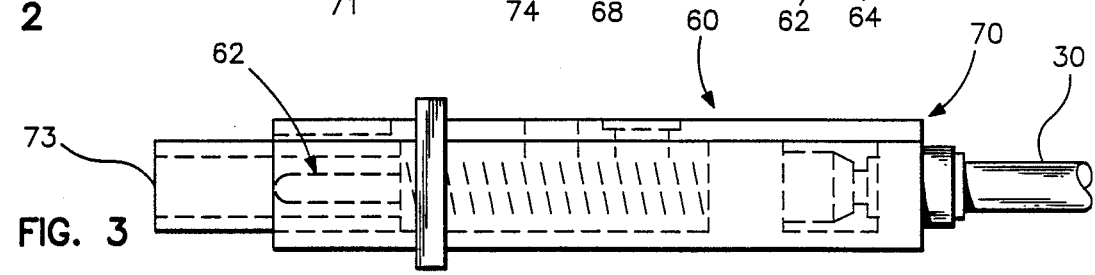
FIG. 3 is a side view of the second connecting means utilizing hidden lines to show the relationship of the elements within the housing and the alignment slot.

Housing 70 also includes a spring-loaded insulating block means 73 (which may be made out of a phenolic or other electrically insulative material) for insulating the probes 71, reducing the chance of accidental arcing and assisting in the proper alignment of the first and second connecting means when they are engaged. Spring means 74 for loading block 73 is shown in FIG. 1. A spring means such as spring 74 fits over and translates on probes 71 which are part of the positive probe 61 and the negative probe 62. In a position of rest, as shown in FIG. 1, the spring 74 is in an extended position. When the first and second connecting means are engaged to allow current flow between the batteries, the block 73 slides along the probes and back into housing 70, compressing the spring means, thus reducing the chance of touching the probes and reducing the chance of the probes engaging the receivers 45 until the probes and the receivers are surrounded by electrically insulative material.

The jumper cable apparatus 10 may include an extension cable apparatus 80 which has a fifth charging transfer cable 81 and a sixth charging transfer cable 82. There is a third connecting means 83 for mating with the first connecting means 20. Third connecting means 83 has probes (not shown) that engage the probe receivers of the first connecting means and the housing 84 engages the housing 44 in the same manner as does housing 70 to assist in aligning the positive cables throughout the jumper cable apparatus 10 when the extension cable apparatus 80 is added.

The extension cable apparatus 80 includes a fourth connecting means 86 for mating with the second connecting means 60 attached to an eleventh end 87 of charging transfer cable 81 and attached to a twelfth end 88 of charging transfer cable 82. Fourth connecting means 86 has probe receivers (not shown) that engage the probes of the second connecting means 60 and the housing 89 engages the housing 70 in the same manner as does housing 44 to assist in aligning the positive cables throughout the jumper cable apparatus 10 when the extension apparatus 80 is added.

The foregoing descriptions and drawings of the invention are explanatory and illustrative only, and various changes in shapes, sizes and arrangement of parts as well as certain details of the illustrated construction may be made within the scope of the appended claims without departing from the true spirit of the invention.

I claim:

1. A jumper cable apparatus comprising:
   a. a first charging transfer cable having on a first end a first attaching means and a second charging transfer cable having on a second end a second attaching means to releasably attach the first and second charging transfer cables to a first pair of battery terminals;
   b. a third charging transfer cable having on a third end a third attaching means and a fourth charging transfer cable having on a fourth end a fourth attaching means to releasably attach the third and fourth charging transfer cables to a second pair of battery terminals;

c. a first connecting body means including circuit means to sense polarity and to limit current attached to a fifth end of the first charging transfer cable and attached to a sixth end of the second charging transfer cable;

the first connecting body means further comprising:

a positive probe receiver connected to the fifth end of the first charging transfer cable;

a negative probe receiver connected to the sixth end of the second charging transfer cable;

a first electrical circuit means to electrically interconnect the first and second charging transfer cables;

a first polarity-sensitive LED in the first circuit means;

a first circuitry test switch in the first circuit means;

a first current-limiting resistor in the first circuit means allowing current flow between the first switch and the first LED;

a first polarity-sensitive piezoelectric alarm in the first circuit means allowing and sensing reversed current flow between the first switch and the negative probe receiver;

a thermally-activated circuit breaker in the first circuit means allowing and limiting current flow between the negative probe receiver and the second charging transfer cable;

an incandescent lamp and a nonpolarity-sensitive alarm in the first circuit means allowing current flow when the circuit breaker interrupts current flow between the negative probe receiver and the second charging transfer cable; and the first switch in the first circuit means allowing selective current flow from the positive probe receiver, through the switch, through the first current-limiting resistor, through the first LED, through the piezoelectric alarm and to the second charging transfer cable;

d. a second connecting body means including circuit means to sense polarity attached to a seventh end of the third charging transfer cable and attached to an eighth end of the fourth charging transfer cable and the second connecting means being selectively engaged with the first connecting means to allow transfer of current between a first battery and a second battery; and e. an insulative translating block means in the second connecting means to reduce contact with an interior of the second connecting means.

2. A jumper cable apparatus as defined in claim 1 wherein the second connecting means further comprises:

a. a positive probe connected to the seventh end of a third charging transfer cable;

b. a negative probe connected to the eighth end of a fourth charging transfer cable;

c. a second electrical circuit means to electrically interconnect the third and fourth charging transfer cables;

d. a second polarity-sensitive LED in the second circuit means;

e. a second circuitry test switch in the second circuit means;

f. a second current-limiting resistor in the second circuit means allowing current flow between the second switch and the second LED;

g. a second polarity-sensitive piezoelectric alarm in the second circuit means allowing and sensing reversed current flow between the second switch and the negative probe; and h. the second switch in the second circuit means allowing selective current flow from the positive probe, through the second switch, through the second current-limiting resistor, through the second piezoelectric alarm and to the negative probe.

3. A jumper cable apparatus comprising:

a. a first charging transfer cable having on a first end a first attaching means and a second charging transfer cable having on a second end a second attaching means to releasably attach the first and second charging transfer cables to a first pair of battery terminals;

b. a third charging transfer cable having on a third end a third attaching means and a fourth charging transfer cable having on a fourth end a fourth attaching means to releasably attach the third and fourth charging transfer cables to a second pair of battery terminals;

c. a positive probe receiver connected to the fifth end of the first charging transfer cable;

d. a negative probe receiver connected to the sixth end of the second charging transfer cable;

e. a first electrical circuit means to electrically interconnect the first and second charging transfer cables;

f. a first polarity-sensitive LED in the first circuit means;

g. a first circuitry test switch in the first circuit means;

h. a first current-limiting resistor in the first circuit means allowing current flow between the first switch and the first LED;

i. a first polarity-sensitive piezoelectric alarm in the first circuit means allowing and sensing reversed current flow between the first switch and the negative probe receiver;

j. a thermally-activated circuit breaker in the first circuit means allowing and limiting current flow between the negative probe receiver and the second charging transfer cable;

k. an incandescent lamp and a nonpolarity-sensitive alarm in the first circuit means allowing current flow when the circuit breaker interrupts current flow between the negative probe receiver and the second charging transfer cable;

l. the first switch in the first circuit means allowing selective current flow from the positive probe receiver, through the first switch, through the first current-limiting resistor, through the first LED, through the first piezoelectric alarm and to the second charging transfer cable.

m. a positive probe connected to the seventh end of a third charging transfer cable;

n. a negative probe connected to the eighth end of a fourth charging transfer cable;

o. a second electrical circuit means to electrically interconnect the third and fourth charging transfer cables;

p. a second polarity-sensitive LED in the second circuit means;

q. a second circuitry test switch in the second circuit means;

r. a second current-limiting resistor in the second circuit means allowing current flow between the second switch and the second LED;

s. a second polarity-sensitive piezoelectric alarm in the second circuit means allowing and sensing reversed current flow between the second switch and the negative probe;

t. the second switch in the second circuit means allowing selective current flow between the positive probe, the second current-limiting resistor, the second piezoelectric alarm and the negative probe;

u. an insulative translating block means in the second connecting means to reduce contact with an interior of the second connecting means; and v. the positive and negative probe receivers being selectively engaged with the positive and negative probes to allow transfer of current between a first battery and a second battery.

4. A jumper cable apparatus as defined in claim 3 further comprising an extension cable apparatus to extend the length of the jumper cable apparatus.

5. A jumper cable apparatus as defined in claim 4 wherein the extension cable apparatus further comprises:

a. A fifth and sixth charging transfer cable;
   b. a third connecting means for mating with the first connecting means attached to a ninth of the fifth charging transfer cable and to a tenth end of the sixth charging transfer cable; and
   c. a fourth connecting means for mating with the second connecting means attached to a eleventh end of the fifth charging transfer cable and to a twelfth end of the sixth charging transfer cable.

6. A jumper cable apparatus as defined in claim 3 wherein the first, second, third and fourth attaching means are color coded to further assist and facilitate which attaching means is to be attached to a positive terminal of the first and second pair of battery terminals.

7. A jumper cable apparatus comprising:

a. a first charging transfer cable having on a first end a first attaching means and a second charging transfer cable having on a second end a second attaching means to releasably attach the first and second charging transfer cables to a first pair of battery terminals;
   b. a third charging transfer cable having on a third end a third attaching means and a fourth charging transfer cable having on a fourth end a fourth attaching means to releasably attach the third and fourth charging transfer cables to a second pair of battery terminals;
   c. a positive probe receiver connected to the fifth end of the first charging transfer cable;
   d. a negative probe receiver connected to the sixth end of the second charging transfer cable;
   e. a first electrical circuit means to electrically interconnect the first and second charging transfer cables;
   f. a first polarity-sensitive LED in the first circuit means;
   g. a first circuitry test switch in the first circuit means;
   h. a first current-limiting resistor in the first circuit means allowing current flow between the first switch and the first LED;
   i. a first polarity-sensitive piezoelectric alarm in the first circuit means allowing and sensing reverse current flow between the first switch and the negative probe receiver;
   j. a thermally-activated circuit breaker in the first circuit means allowing and limiting current flow between the negative probe receiver and the second charging transfer cable;
   k. an incandescent lamp and a nonpolarity-sensitive alarm in the first circuit means allowing current flow when the circuit breaker interrupts current flow between the negative probe receiver and the second charging transfer cable;
   l. the first switch in the first circuit means allowing selective current flow from the positive probe receiver, through the first switch, through the first current-limiting resistor, through the first LED, through the piezoelectric alarm and to the second charging transfer cable;
   m. a positive probe connected to the seventh end of a third charging transfer cable;
   n. a negative probe connected to the eighth end of a fourth charging transfer cable;
   o. a second electrical circuit means to electrically interconnect the third and fourth charging transfer cables;
   p. a second polarity-sensitive LED in the second circuit means;
   q. a second circuitry test switch in the second circuit means;
   r. a second current-limiting resistor in the second circuit means allowing current flow between the second switch and the second LED;
   s. a second polarity-sensitive piezoelectric alarm in the second circuit means allowing and sensing reversed current flow between the second switch and the negative probe;
   t. the second switch in the second circuit means allowing selective current flow from the positive probe, through the second switch, through the second current-limiting resistor, through the second piezoelectric alarm and to the negative probe;
   u. an insulative translating block means in the second connecting means to reduce contact with an interior of the second connecting means;
   v. the positive and negative probe receivers being selectively engaged with the positive and negative probes to allow transfer of current between a first battery and a second battery;
   w. a fifth and sixth charging transfer cable;
   x. a third connecting means for mating with the first connecting means attached to a ninth end of the fifth charging transfer cable and to a tenth end of the sixth charging transfer cable ;
   y. a fourth connecting means for mating with the second connecting means attached to a eleventh end of the fifth charging transfer cable and to a twelfth end of the sixth charging transfer cable: and
   z. the first, second, third and fourth attaching means being color coded to further assist and facilitate which attaching means is to be attached to a positive terminal of the first and second pair of battery terminals.

* * * * *